United States Patent
Recoquillay et al.

(10) Patent No.: US 12,216,088 B2
(45) Date of Patent: Feb. 4, 2025

(54) IMAGING OF ELASTIC WAVE GUIDES INTERCONNECTED BY A JUNCTION

(71) Applicants: COMMISSARIAT A L'ENERGIE ATOMIQUE ET AUX ENERGIES ALTERNATIVES, Paris (FR); ECOLE NATIONALE SUPERIEURE DE TECHNIQUES AVANCEES, Palaiseau (FR)

(72) Inventors: Arnaud Recoquillay, Gif-sur-Yvette (FR); Jean-François Fritsch, Gif-sur-Yvette (FR); Laurent Bourgeois, Verrieres-le-Buisson (FR)

(73) Assignees: COMMISSARIAT A L'ENERGIE ATOMIQUE ET AUX ENERGIES ALTERNATIVES, Paris (FR); ECOLE NATIONALE SUPERIEURE DE TECHNIQUES AVANCEES, Palaiseau (FR)

( * ) Notice: Subject to any disclaimer, the term of this patent is extended or adjusted under 35 U.S.C. 154(b) by 491 days.

(21) Appl. No.: 17/543,270

(22) Filed: Dec. 6, 2021

(65) Prior Publication Data
US 2022/0178883 A1    Jun. 9, 2022

(30) Foreign Application Priority Data
Dec. 8, 2020  (FR) ...................... 2012832

(51) Int. Cl.
*G01N 29/06*  (2006.01)
*G01N 29/22*  (2006.01)
*G01N 29/44*  (2006.01)

(52) U.S. Cl.
CPC ....... *G01N 29/0654* (2013.01); *G01N 29/221* (2013.01); *G01N 29/4472* (2013.01);
(Continued)

(58) Field of Classification Search
CPC ............ G01N 29/0654; G01N 29/221; G01N 29/4472; G01N 2291/015;
(Continued)

(56) References Cited

U.S. PATENT DOCUMENTS

2018/0136170 A1*  5/2018  De Marchi .......... G10K 11/343

OTHER PUBLICATIONS

Bourgeois, et al., "Imaging junctions of waveguides", Inverse Problems and Imaging, 2020.
(Continued)

*Primary Examiner* — Matthew G Marini
*Assistant Examiner* — Leo T Hinze
(74) *Attorney, Agent, or Firm* — BakerHostetler

(57) ABSTRACT

A method for imaging a structure composed of at least one wave guide connected to a junction, the structure supporting elastic wave guided propagation modes, the method includes the following steps: for at least one operating frequency, acquiring a plurality of measurements of signals propagating in the structure by means of a plurality of pairs of non-colocalized elastic wave sensors, determining a plurality of propagation modes guided by the structure, correcting the measurements on the basis of ultrasound signals measured or simulated for the same structure in the absence of any defect, converting the measurement matrix M into a wave field scattering matrix U, determining, at each point of a sampling grid, a test vector F characteristic of the structure without any defect, applying a numerical inversion method to determine a vector H of modal components such that U.H=F at each point of a sampling grid, determining an image of the structure on the basis of the vector H.

17 Claims, 4 Drawing Sheets

(52) U.S. Cl.
CPC ............ *G01N 2291/015* (2013.01); *G01N 2291/0289* (2013.01)

(58) Field of Classification Search
CPC ....... G01N 2291/0289; G01N 29/4463; G01N 29/52; G01N 2291/0425; G01N 2291/0427; G01N 29/043; G01N 29/30
See application file for complete search history.

(56) References Cited

OTHER PUBLICATIONS

Baronian, et al., "Linear Sampling Method applied to Non Destructive Testing of an elastic waveguide: theory, numerics and experiments", Inverse Problems, vol. 34, No. 7, 2018.

Recoquillay, "Methodes d'échantillonnage appliquées à l'imagerie de défauts dans un guide d'ondes élastiques", Physique mathématique [math-ph], Université Paris Saclay, 2018.

Baronian, et al., "Transparent boundary conditions for the harmonic diffraction problem in an elastic waveguide", Journal of Computational and Applied Mathematics, vol. 234, Issue 6, pp. 1945-1952, Jul. 15, 2010.

\* cited by examiner

IMAGING OF ELASTIC WAVE GUIDES INTERCONNECTED BY A JUNCTION

CROSS-REFERENCE TO RELATED APPLICATIONS

This application claims priority to foreign French patent application No. FR 2012832, filed on Dec. 8, 2020, the disclosure of which is incorporated by reference in its entirety.

FIELD OF THE INVENTION

The invention relates to the field of non-destructive testing of mechanical structures or structural health monitoring and more specifically to methods for imaging such structures whose aim is to detect the presence of defects and to image them.

More specifically, the invention relates to a method for imaging of elastic wave guides interconnected by a junction. The structure is composed of one or more guides of constant cross section, the guides being interconnected by means of a junction of any shape.

BACKGROUND

For example, the structure to be imaged consists of a plurality of rails or of a plurality of tubes or pipes welded together. The invention also applies to medical imaging for the purpose of imaging the body's bones. The invention also applies to a structure composed of a wave guide of constant cross section connected to a terminal end piece of any shape.

The linear sampling method (LSM) allows imaging by means of high-frequency guided waves unlike the typical imaging methods which are often limited to lower frequencies.

Specifically, modal LSM uses all of the guided propagation modes unlike other imaging methods which are based on the selection of one particular mode.

One general problem to be solved consists in adapting this imaging method to image structures of the type of elastic wave guides interconnected by junctions of any shape and without access to the interior of the structure.

References [1] and [2] describe the application of modal LSM to the case of a two-dimensional structure of the type of a plate or guide of constant cross section. However, the described method does not account for the case of a plurality of guides connected by a junction of any shape.

Reference [3] develops theoretical principles that are applicable to wave guide junctions but only for acoustic waves and assuming the ability to transmit guided modes and measure the corresponding scattered waves on sections of the guide, thus the ability to have access to the cross section of the guide, which is not always possible.

Reference [4] describes, furthermore, a method for the analytical propagation of elastic waves in wave guides exhibiting a disruption, which is applicable to reference fields for wave guide junctions.

SUMMARY OF THE INVENTION

The present invention relates to an imaging method based on modal LSM which is applicable to elastic wave guide junctions. The present method has the advantage of allowing the high-frequency imaging of structures of complex shape using sensors positioned only on the surface of the structure.

One subject of the invention is a method for imaging a structure composed of at least one wave guide connected to a junction, the structure supporting elastic wave guided propagation modes, the structure having at least one defect, the method comprising the following steps:
for at least one operating frequency, acquiring a plurality of measurements of signals propagating in the structure by means of a plurality of pairs of non-colocalized elastic wave sensors, the measurements being organized in a measurement matrix M with dimensions equal to the number of transmitting sensors by the number of receiving sensors,
determining a plurality of propagation modes guided by the structure, correcting the measurements on the basis of ultrasound signals measured or simulated for the same structure in the absence of any defect,
converting the measurement matrix M into a wave field scattering matrix U,
determining, at each point of a sampling grid, a test vector F characteristic of the structure without any defect, the components of which are the projections of a Green tensor from the defect-free domain onto the transverse functions of the guided propagation modes, applying a numerical inversion method to determine a vector H of modal components such that U.H=F at each point of a sampling grid, determining an image of the structure on the basis of the vector H.

According to one particular aspect of the invention, the scattering matrix U is determined by means of the relationship NC=−RUε where R is a matrix whose coefficients are determined by the projection of a reception function of a sensor onto the guided propagation modes and ε is a matrix whose coefficients are determined by the projection of a transmission function of a sensor onto the guided propagation modes.

According to one particular aspect of the invention, the test vector F is determined by:
calculating reference wave fields corresponding to sums of incident wave fields and wave fields scattered by the junction in the absence of any defect in the structure,
determining the test vector F on the basis of the calculated reference wave fields.

According to one aspect of the invention, the reference wave fields are calculated by means of a finite element numerical solution.

According to one particular aspect of the invention, the reference wave fields are calculated by means of a finite element numerical solution in a region defined by the junction and are then propagated analytically in each wave guide.

According to one particular aspect of the invention, the reference wave fields in each wave guide are calculated on the basis of the reference wave fields in the junction by means of the following steps:
determining the wave fields scattered by the junction on the basis of the reference wave fields,
propagating the wave fields scattered by the junction in each wave guide by calculating the sum of the guided propagation modes weighted by the modal coefficients of the scattered wave fields,
determining the reference wave fields in each wave guide as the sum of the propagated scattered wave fields and of the guided propagation modes.

According to one particular aspect of the invention, the image of the structure is determined on the basis of the inverse of the norm of the vector H at any point of the structure to be imaged.

According to one particular aspect of the invention, the steps of the method are executed for a plurality of operating frequencies.

According to one particular aspect of the invention, the imaging of the structure is determined on the basis of a sum of the squared norms of the vectors H calculated for various operating frequencies, at any point of the structure to be imaged.

According to one particular aspect of the invention, the elastic wave sensors are positioned on the surface of the structure or integrated into the structure.

Another subject of the invention is an imaging device comprising an array of elastic wave sensors intended to be positioned on a structure to be imaged and a processing unit able to receive the signals acquired by the sensors and configured to execute the steps of the imaging method according to the invention.

According to one particular aspect of the invention, the elastic wave sensors are chosen from among piezoelectric transducers, electromagnetic acoustic transducers or fibre Bragg gratings.

According to one particular aspect of the invention, the elastic wave sensors are positioned on the surface of the structure or integrated into the structure.

BRIEF DESCRIPTION OF THE DRAWINGS

Other features and advantages of the present invention will become more clearly apparent from reading the following description and with reference to the following appended drawings.

DETAILED DESCRIPTION

The invention aims to provide an imaging method for structures composed of wave guides of constant cross section connected to one another by junctions of any shape.

Figure 1:
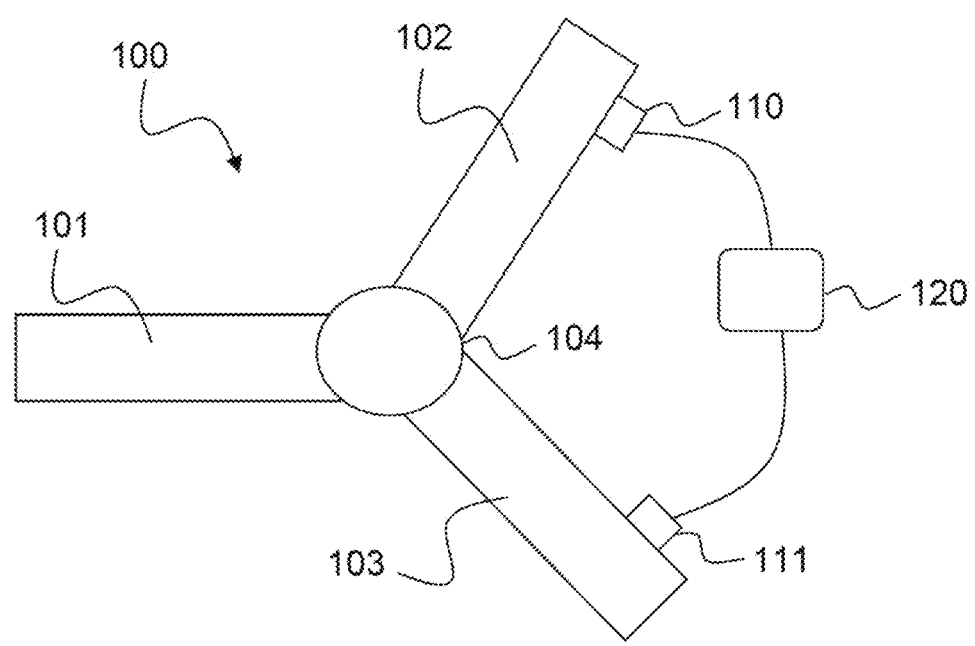
FIG. 1 shows a structure composed of three wave guides and of a junction.

One example of a structure 100 to be imaged is shown schematically in FIG. 1 in top view. This structure is composed of three identical wave guides 101,102,103 each having a constant cross section. The three tubes are interconnected by means of a junction 104 of any shape (spherical for the example of FIG. 1).

Without departing from the scope of the invention, there may be any number of wave guides. The structure may also be composed of just one wave guide connected at one end to an end piece of any shape. The cross sections of the guides may be variable in shape (circular, rectangular, square, or of any shape); the constituent materials thereof may also differ.

First, a few of the concepts regarding elastic wave guides are recalled.

A wave guide is generally modelled, mathematically, by the product of a bounded section $\Sigma$ and of an axis that is assumed to be infinite. In practice, the length of the guide is not infinite but a model using guided waves is valid as long as the length of the guide along its axis is large with respect to the diameter of the cross section. This property is true for rail- or pipe-type structures in particular.

Elastic ultrasound waves propagating in these structures may be decomposed into a plurality of guided propagation modes.

Each guided mode may be modelled by the product of a function of the transverse variable defined in the cross section (called transverse function) and of a function of the axial variable defining the position along the axis of the guide.

Figure 2:
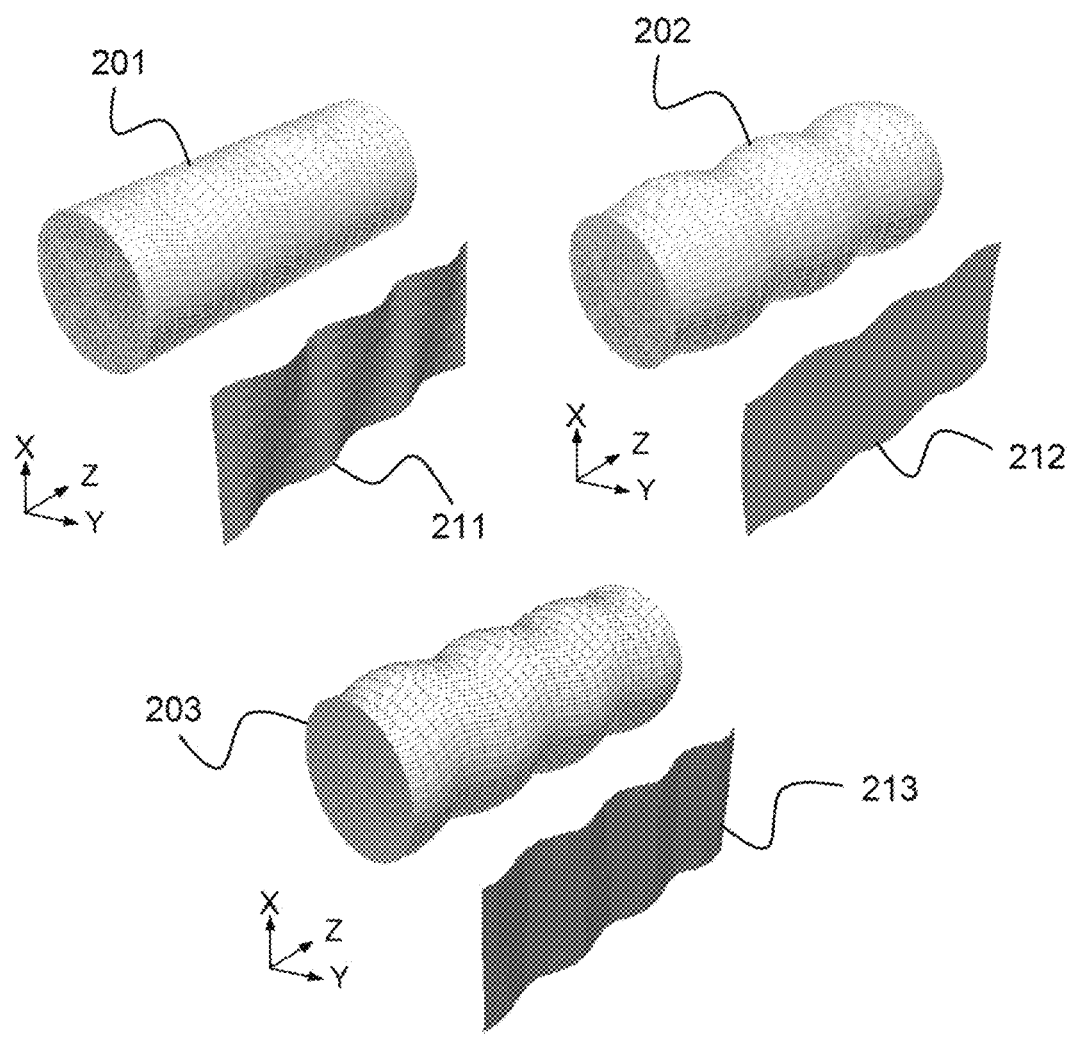
FIG. 2 shows a diagram illustrating propagation modes in an elastic wave guide.

FIG. 2 schematically shows a number of examples of guided modes in a structure in the shape of a tube for a time harmonic wave, of angular frequency $\omega$.

The examples given are generalized to the transient state using a time Fourier transform.

The examples of FIG. 2 correspond to guided modes of torsional type (201), compressive type (202) and flexural type (203). For each mode, there is shown the function along a cross section of the guide 211,212,213 and the guided mode 201,202,203 resulting from the product of the transverse function and of the axial function.

The axial function of the guide is of the form $e^{\pm i\beta_n z}$, where z is the coordinate along the axis of the guide, $\beta_n$ is the wave number of the mode n and the sign+/− is dependent on the direction of propagation of the mode. Depending on the values of $\beta_n$, there are three types of modes:

propagating modes, for which $\beta_n$ is a real number and therefore the mode is purely oscillating along the axis;

evanescent modes for which $\beta_n$ is an imaginary number and therefore the mode grows or decays exponentially along the axis according to the sign of the imaginary part of $\beta_n$;

inhomogeneous modes for which $\beta_n$ is a complex number. They also exponentially grow or decay according to the sign of the imaginary part of $\beta_n$.

Guided elastic wave theory states that there is a finite number of propagating modes at a given frequency $\omega$.

As accounting for the physics or, equivalently, the radiation conditions, implies that the other modes are subject to exponential decay, knowing the modal components of a field that is undulating according to just the propagating modes allows this field to be described at any point sufficiently far from the source of the field for wave guides without attenuation.

In the case of attenuation along the guide being non-negligible, the inhomogeneous modes for which the imaginary part of the wave number is small are taken into account.

To describe the transverse functions and elastodynamic LSM, it is necessary to introduce mixed variables X,Y as defined in document [4], mixing components of the displacement field and components of the tensor of the strains.

For the displacement field u, in the guide r let $t^r$ denote its axial strain, namely:

$$t^r = \sigma(u)e_3^r,$$

where $e_3^r$ denotes the unit vector of the axis of the guide r.

The variables $x^r$ and $\mathcal{Y}^r$ are then introduced.

$$\mathcal{X}^r(u) = \begin{pmatrix} t_1^r \\ t_2^r \\ u_3^r \end{pmatrix}$$

$$\mathcal{Y}^r(u) = \begin{pmatrix} u_1^r \\ u_2^r \\ -t_3^r \end{pmatrix}.$$

Additionally defined are $x_n^l$, respectively $\mathcal{Y}_n^l$, the variable x, respectively the variable $\mathcal{Y}$, of the transverse function associated with the mode n of the guide l. This notation is unambiguous given that the mode n of the guide l is defined only in the guide l.

When it is sought to image a structure in order to identify internal defects (field of non-destructive testing), the fields scattered by this defect are of interest. The scattered field is the field obtained after subtraction of the incident field, which is the field propagating in the absence of any defect. The sum of the scattered field and of the incident field is called the total field.

The field scattered by a defect in a wave guide may be expressed as a function of the various modes. More specifically, since all of the fields may be expressed on a modal base (base defined by the modes), the defect may be characterized by the scattering of the various modes, which is represented in a scattering matrix.

It is therefore possible to define the scattering matrix S as the projection of the scattered fields associated with the various incident modes onto the transverse functions associated with the various modes, in the directions of propagation in the guides. The scattering matrix therefore has four blocks in a simple guide, corresponding respectively to an incident field propagating in the direction of increasing, respectively decreasing, axial coordinates, for a scattered field propagating in the direction of increasing, respectively decreasing, axial coordinates. There are therefore two transmission blocks and two reflection blocks.

The scattering matrix S makes it possible to describe the scattering of any incident field by the defect.

The case of two guides is easily generalized to N guides where N is strictly larger than 2, by defining the $N^2$ blocks of the scattering matrix, these blocks corresponding to the scattered fields propagating in the N guides for the various incident fields propagating in these N guides.

In the case of a guide 101 connected to a junction 104 (as shown in FIG. 1), the scattering of the junction and of the defect are handled differently. On the one hand, there is considered the total field associated with the junction 104 in the absence of any defect for an incident mode. This total field is called the reference field and is denoted by $u_n^{j,ref}$ for the n-th incident mode $u_n^j$ of the guide j. It corresponds to the sum of the incident field and of the scattered field on the junction 104.

On the other hand, if the presence of a defect in the structure 100 is considered, this defect also generates a scattered field. The field scattered by the defect corresponds to the scattering of the reference field by the defect.

Document [1] describes the application of a numerical solving method called LSM (linear sampling method) to the imaging of elastic wave guides. This method is based on the scattering matrix S which corresponds to the projection, onto the transverse functions of the modes of the various guides, of the various scattered fields associated with the reference fields, in other words the scattered fields associated with just the defect to be imaged.

It should be noted that LSM is applicable both when all of the blocks of the matrix are accessible and when just some of the blocks are, namely when only some reference fields have been transmitted and some scattered fields have been measured.

Figure 3:
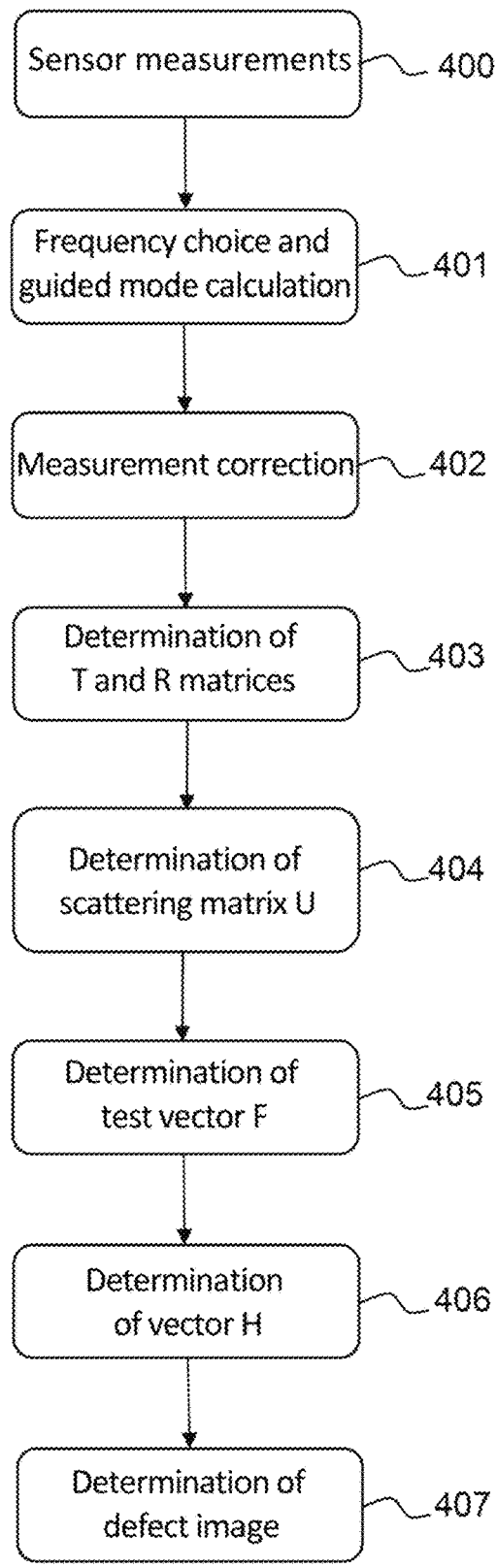
FIG. 3 shows a flowchart detailing the steps for implementing one embodiment of the method of the invention.

FIG. 3 describes, in a flowchart, the steps for implementing a method for imaging a structure of the type described in FIG. 1.

The invention is implemented by means of elastic ultrasound wave sensors 110,111.

The sensors are chosen from among piezoelectric transducers, electromagnetic acoustic transducers (for example EMATs or magnetostrictive patches) or fibre Bragg gratings.

The sensors 110,111 may be positioned on the surface of the structure or integrated into the structure at locations chosen so as to be sufficiently far from the defects and from the junction.

Each sensor 110,111 is connected to a signal acquisition chain and all of the sensors are connected to a processing unit 120 which is configured to execute the imaging method according to one of the embodiments of the invention.

The processing unit 120 may be embodied as software and/or hardware on the basis of a processor and a memory. The processor may be a generic processor, a specific processor, an application-specific integrated circuit (ASIC) or a field-programmable gate array (FPGA).

The results delivered by the processing unit may be displayed on a computer screen or directly on an interface forming part of the device.

To image an inspection region of the structure 100, the sensors may be arranged on either side or only on one side of the region to be imaged. Their positions may be determined randomly or according to a regular pattern.

Each sensor may combine the function of both transmitter and receiver or have only one of the two functions.

The method of the invention starts with a first step 400 of acquiring ultrasound measurement signals by means of the various sensors acting as receiving sensors. Various acquisition methods may be envisaged, for example sequential acquisition in which each transmitter successively sends an elastic wave into the structure and measurement of the propagated signal is performed by all of the receivers for each transmitted elastic wave.

In a second step 401, a time Fourier transform is applied to the measurements, and the various guided modes are determined on the basis of the reference structure using a numerical method, for example a "SAFE" method.

The method of the invention is applicable for one or more frequencies of the passband. A frequency of interest is therefore selected in step 401.

In a next step, 402, correction signals are subtracted from the measurements, these signals corresponding to the ultrasound signals acquired in the same configuration on the structure 100 but in the absence of any defect. These signals may be obtained, for example, by way of measurement on the healthy structure 100, without any defect, or by way of finite element analysis or simulation. In the latter case, the guided modes determined in step 401 are used to obtain these signals.

The measurements are grouped together in a matrix M whose rows correspond to the transmissions and whose columns correspond to the receivers. Each measurement consists of a sequence of samples obtained for a predetermined acquisition time. In other words, the measurements are characterized by three dimensions: the index of the transmitter, the index of the receiver and the index of the time sample.

In one variant embodiment, a plurality of transmitters may transmit signals simultaneously. In general, the sequence of measurements may be performed in a number of ways by varying the sequencing and the number of transmissions, of receptions and also the acquisition time. In particular, the transmissions may be simultaneous or successive for a plurality of sensors.

To apply modal LSM, it is necessary to be able to determine the scattering matrix corresponding to the defect to be identified in the structure. The most natural method to obtain it is then to successively transmit each guided mode and to measure the modal components of the corresponding scattered fields.

This method is difficult to apply in practice: since the modal coefficients are projections of the fields onto the transverse functions of the modes in the section of the guide, it is necessary to have access to the latter in order to calculate them.

Similarly, for concrete applications, it is not realistic to transmit each mode separately.

One solution proposed in reference [2] consists in establishing a link between measurements acquired at the surface of the wave guide and the scattering matrix. The principle is as follows: considering a set of sources and of receivers positioned on the surface of the wave guide. The numbers, positions and types (piezoelectric, EMAT, etc.) of the sensors acting as sources may be the same as or different from those acting as receivers. The sources and the receivers are assumed to be far from the defect along the axis. Under these conditions, it is possible to decompose the fields measured by the receivers for each source as combinations of the guided modes, and to retain in this combination only the contributions of the propagating modes, the other contributions being, by way of assumption, attenuated before reaching the sensors.

From the teachings of document [1], it is shown that the scattering matrix S, and even the matrix of the LSM system U directly, may be obtained from the measurement matrix $\mathcal{M}$ by inverting both transmission $\varepsilon$ and reception $\mathcal{R}$ matrices by virtue of the following relationship:

$$\mathcal{M} = -R U \varepsilon. \quad (1)$$

The transmission $\varepsilon$ and reception $\mathcal{R}$ matrices are dependent only on the guided modes, and on the sources and receivers. It should be noted that the number of sources and of receivers may be greater than the number of propagating modes, the matrices $\mathcal{R}$ and $\varepsilon$ are generally rectangular, the system then having to be solved in the least squares sense.

In a step 403 of the method, the transmission $\varepsilon$ and reception $\mathcal{R}$ matrices are determined in the following manner.

More specifically, considering the case in which the sensors are all positioned on the surface of one and the same guide I, let $\Gamma_I$ denote its surface. The case in which the sources and the receivers are distributed over various different guides or are integrated into the guides is deduced directly therefrom.

Considering a number $M_r$ of receivers and a number $M_e$ of transmitters, having respective transmission and reception functions $f_n^r$, n=1, . . . , $M_r$ and $f_n^e$, n=1, . . . , $M_e$, the supports of these functions being defined on the surface of the guide $\Gamma_I$. The transmission and reception functions are defined by the characteristics of the sensors (their type, transmission power, etc.).

It should be noted that these functions are vector functions, in order to represent different sensitivity to the various components of the wave field, in terms of displacement or strain, transmitted or received by a sensor. The coefficients of the matrices R and $\varepsilon$ are then expressed as:

$$R_{ij} = \int_{\Gamma_I} f_i^r(x) \cdot \begin{pmatrix} x_j^I \\ y_j^I \end{pmatrix} dx$$

-continued $$E_{ij} = \int_{\Gamma_I} f_j^e(x) \cdot \begin{pmatrix} x_i^I \\ y_i^I \end{pmatrix} dx$$

where $$\begin{pmatrix} x_j^I \\ y_j^I \end{pmatrix}$$

is the i-th mode of the guide I, written in mixed variables x $\mathcal{Y}$, which is dependent on the characteristics of the guide.

In the case of the sensors being positioned on various guides (for example the guides 101,102,103 in the example of FIG. 1), the matrices $\mathcal{R}$ and $\varepsilon$ are built of blocks, the extradiagonal blocks being zero. Specifically, it is seen in the preceding expressions that, for the matrix $\mathcal{R}$, each row corresponds to a sensor while each column corresponds to a guided mode. This is still the case in the case of sensors positioned on a plurality of guides, but the guided modes correspond to the various guides. Thus, the coefficient corresponding to the integral for a sensor on a first guide for a mode associated with another guide is zero. This analysis is also valid for the matrix $\varepsilon$ by inverting the rows and the columns.

Thus, the dimensions of the transmission matrix $\varepsilon$ are the product of the sum of the number of transmitters on each guide by the sum of the number of propagating guided modes in each guide. The dimensions of the reception matrix $\mathcal{R}$ are the product of the sum of the number of receivers on each guide by the sum of the number of propagating guided modes in each guide.

In a step 404, equation (2) is then solved, for example in the least squares sense, to determine the matrix U:

$$U = -(\mathcal{R}^*\mathcal{M})^{-1}\mathcal{R}^*\mathcal{R} \varepsilon^*(\varepsilon\varepsilon^*)^{-1},$$

where $\cdot^*$ denotes the complex conjugate operator.

In practice, the matrix U is directly dependent on the scattering matrix S.

Simplistically, it is considered hereinafter that the matrix U corresponds to the scattering matrix S, the two matrices differing in practice by a multiplication by a diagonal matrix dependent only on guided modes.

The LSM numerical solving method is an inversion method which consists in inverting a system of the form:

$$UH(x)=F(x) \quad (3)$$

U is the scattering matrix determined in step 404 which contains only the contributions of the fields scattered by the defect to be imaged.

H(x) is a vector of modal components to be determined at any point x of a sampling grid defining the region to be imaged. In other words, H(x) is related to the image obtained by the method of the invention. This is a vector that it is sought to determine in order to image the structure.

F(x) is a vector which is dependent on the characteristics of the structure to be imaged without any defect, i.e. the healthy structure. This vector may be calculated by simulating the propagation of the guided modes in the structure without any defect. In other words, F(x) corresponds to the theoretical response of the structure without any defect.

The components of this vector are the projections of the Green tensor from the domain (which corresponds to the structure without any defect), onto the transverse functions of the guided modes.

Thus, in the case of a structure composed of N elastic guides interconnected by means of a junction and each having $P_n$ propagating modes, $1 \leq n \leq N$, the vector F is written in the form:

$$F(x) = \begin{pmatrix} \left( -\left( G(\cdot, x) p, \begin{pmatrix} X_j^I \\ Y_j^I \end{pmatrix} \right) \right)_{\Sigma_I} \\ \vdots \\ \left( -\left( G(\cdot, x) p, \begin{pmatrix} X_{P_N}^N \\ Y_{P_N}^N \end{pmatrix} \right) \right)_{\Sigma_N} \end{pmatrix} \quad (4)$$

where G denotes the Green tensor generalized in terms of variables $x\mathcal{Y}$, as defined in [2], $$\begin{pmatrix} X_m^r \\ \mathcal{Y}_m^r \end{pmatrix}$$

denotes the m-th transverse function of the guide r, and $(\cdot,\cdot)_{\Sigma_r}$ is a bilinear form, where $\Sigma_r$ denotes the section of observation in the guide r:

$$\left( \begin{pmatrix} X^r(u) \\ \mathcal{Y}^r(u) \end{pmatrix}, \begin{pmatrix} X^r(v) \\ \mathcal{Y}^r(v) \end{pmatrix} \right)_{\Sigma_r} = \int_{\Sigma_r} (X^r(u) \cdot \mathcal{Y}^r(v) + X^r(v) \cdot \mathcal{Y}^r(u)) dx,$$

p is a unit polarization vector. Since the generalized Green tensor is of the size 6×6, this polarization parameter p makes it possible to define six independent functions F by choosing one component of p to be equal to 1 and the other to 0, for example p=(1,0,0,0,0,0).

In the case of elastic waves, the wave fields are vectors and the Green function corresponds to a second-order tensor.

The Green tensor is written as a function of the reference fields.

There is defined the concept of reference field $u_n^{j,ref}$ corresponding to the response of the structure in the absence of any defect, with respect to the incident guided mode n of the guide j. Le reference field corresponds to the total field scattered by the structure without any defect as explained in the preamble.

The reference fields are determined as being the solution to the following system of equations:

$$\mathrm{div}\sigma(u_m^{r,ref}) + \rho\omega^2 u_m^{r,ref} = 0 \text{ in } W$$

$$\sigma(u_m^{r,ref})v = 0 \text{ on } \partial W$$

$$u_m^{r,ref} - u_m^r \text{ is outgoing,} \quad (5)$$

where div is the divergence operator, σ is the tensor of the strains defined by Hooke's law, $$\sigma(u) = \frac{c}{2}(\nabla u + \nabla u^T),$$

where C is the Hooke tensor, ρ is the density, ω is the angular frequency, W denotes the structure without any defect, v is the outgoing normal with respect to W and u is the displacement field.

The condition "$u_m^{r,ref} - u_m^r$ is outgoing" is necessary because, without it, the two first equations allow two open solutions, corresponding respectively to a wave propagating from infinity to the junction and to a wave propagating from the junction to infinity. The physics of the problem dictates retaining only the solution from the junction to infinity, corresponding to a wave scattered by the junction and therefore "outgoing".

Additionally, the guided modes in each guide r (outside of the junction) are defined as the product of a function of the local transverse variable $x_s^r$ and of an oscillating and/or exponentially decaying function of the local axial variable $x_3^r$.

The system of equations (5) may be solved using finite element analysis, using artificial boundary conditions equivalent to the radiation condition. These boundary conditions imply operators acting on the mixed variables $x\mathcal{Y}$ as defined in document [4]. The reference fields $u_m^{r,ref}$ are thus obtained through numerical solving.

Determined next is the vector F(x) on the basis of the reference fields by means of the following process.

The condition "$u_m^{r,ref} - u_m^r$ is outgoing" becomes $$x^l(u_m^{r,ref} - u_m^r) = T^l(\mathcal{Y}^l(u_m^{r,ref} - u_m^r))$$

On $\Sigma_l$, $l=1, \ldots, N$.

The operator $T^l$ is then defined as $$T^l(\mathcal{Y}^l) = \Sigma_{n \in N} (x_n^l, \mathcal{Y}^l)_{\Sigma_l} x_n^l. \quad (6)$$

It is then possible to show, by virtue of the symmetry of the Green tensor, that the vector F(x) is expressed on the basis of the reference fields according to the following expression:

$$F(x) = \begin{pmatrix} \begin{pmatrix} X^I(u_1^{I,ref}(x)) \\ \mathcal{Y}^I(u_1^{I,ref}(x)) \end{pmatrix} \cdot p \frac{e^{i\beta_1^I R^1}}{2} \\ \vdots \\ \begin{pmatrix} X^N(u_1^{N,ref}(x)) \\ \mathcal{Y}^N(u_1^{N,ref}(x)) \end{pmatrix} \cdot p \frac{e^{i\beta_{P_N}^N R^N}}{2} \end{pmatrix} \quad (7)$$

In practice, the choice of the polarization has only a small effect on the result of the imaging for non-void interior defects.

$\beta_m^r$ is the wave number of the mode m of the guide r, $R^r$ is the coordinate along the axis of the guide r of the section $\Sigma_r$ and $u_m^{r,ref}$ is the reference field associated with the mode m of the guide r.

In summary, the vector F(x) may be determined by means of relationship (7) having previously calculated the reference fields (fields scattered by the structure in the absence of defects) by solving system (5).

After having determined the vector F(x) in step 405, the final vector H(x) is finally calculated (in step 406) by inverting equation (3).

The final vector H is calculated for each position x of the sampling grid, for an angular frequency ω and for a polarization p.

In a final step 407, a function indicative of a defect is determined, for example in the form:

$$\varphi(x) = \log\left(\frac{1}{\|H(x)\|}\right).$$

In one variant embodiment, if the method is applied for a plurality of angular frequencies, the indicative function may be expressed by the following relationship:

$$\varphi(x; p) = -\frac{1}{2} \log \left( \sum_\omega \frac{\|H(x; \omega, p)\|^2}{\max_{\tilde{x}} \|H(\tilde{x}; \omega, p)\|^2} \right).$$

Figure 4:
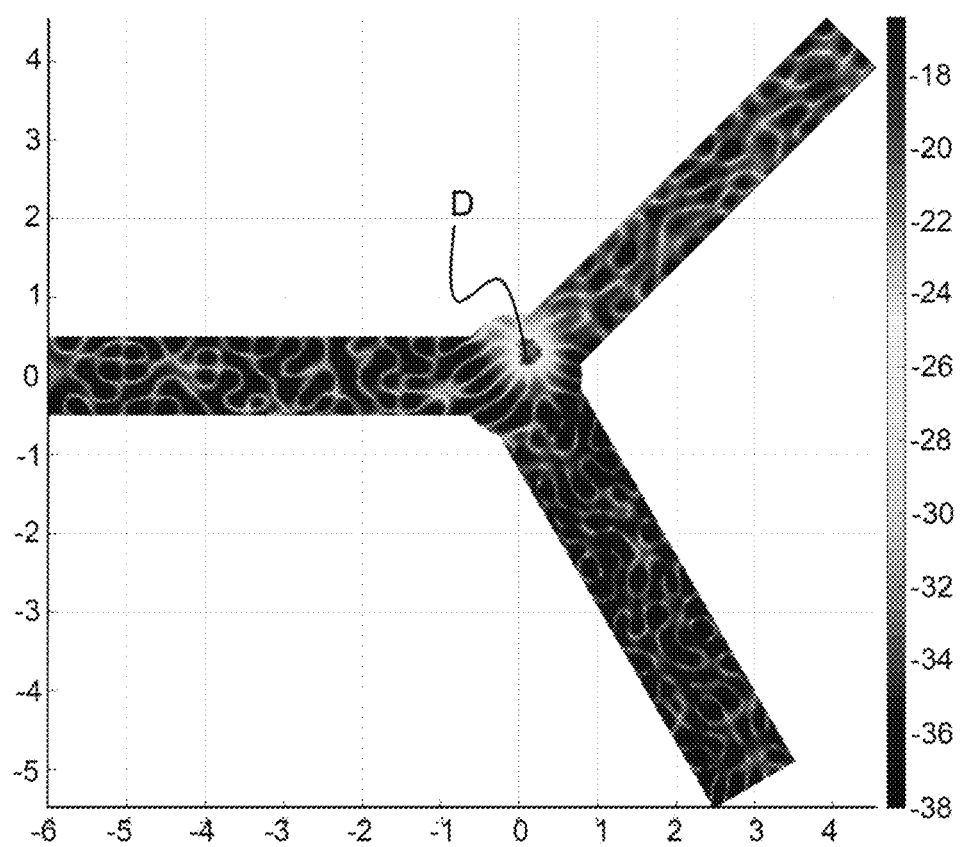
FIG. 4 shows one example of imaging obtained for a structure composed of three wave guides interconnected by a junction.

FIG. 4 illustrates an imaging result obtained using the method of the invention for a structure of the type of FIG. 1 exhibiting a defect D.

Now described is one variant embodiment for calculating the reference fields $u_m^{r,ref}$ which then allows the time for calculating the vector F(x) to be optimized.

One difficulty inherent to modal LSM generalized to guide junctions is the need to numerically calculate the reference fields for each point of the region to be imaged in order to calculate the vector F(x). Specifically, as explained above, this calculation requires numerically solving the system of equations (5) in each guide r connected to the junction.

In the case of two-dimensional acoustic wave guides, the additional computing cost is not necessarily an issue. For three-dimensional or elastic cases, this cost may become prohibitive if the region to be imaged is large.

To overcome this drawback, one solution is to couple the solution to the numerical problem to an analytical propagation of the reference fields. Specifically, when calculating the reference fields using equations (5), the computational domain coincides with the sampling region for LSM, delimited by the sections $\Sigma_l$.

The solution proposed here consists in defining sections $\Sigma_l$ close to the junction for finite element analysis, and then analytically propagating the reference field obtained for the guides of constant cross section.

Let $u_m^{r,ref}$ be a reference field (associated with the structure without any defect for the incident mode m in the guide r) and let $u^{scat}$ be the field scattered by the junction without any defect.

$u^{scat} = u_m^{r,ref} - u_m^r$ in the guide r defined by the structure as shown in FIG. 6.

$u^{scat} = u^{r,ref}$ in the rest of the guide (outside of the junction). where $u_m^{r,ref}$ is the solution to (5). The reference field $u_m^{r,ref}$ has been calculated in the finite element domain. The modal coefficients of the scattered field are defined:

$$A_n^l = (x_n^l, \mathcal{Y}^l(u^{scat}))_{\Sigma_l}.$$

It should be noted that the finite element calculation carried out almost directly provides the variable $\mathcal{Y}^l(u^{scat})$: specifically, the finite element calculation $\mathcal{Y}^l(u_m^{r,ref})$ by virtue of the use of the operators $T^l$, and the variable $\mathcal{Y}_m^r$ is obtained in the calculation of the modes through numerical solving, for example using a SAFE method.

Figure 5:
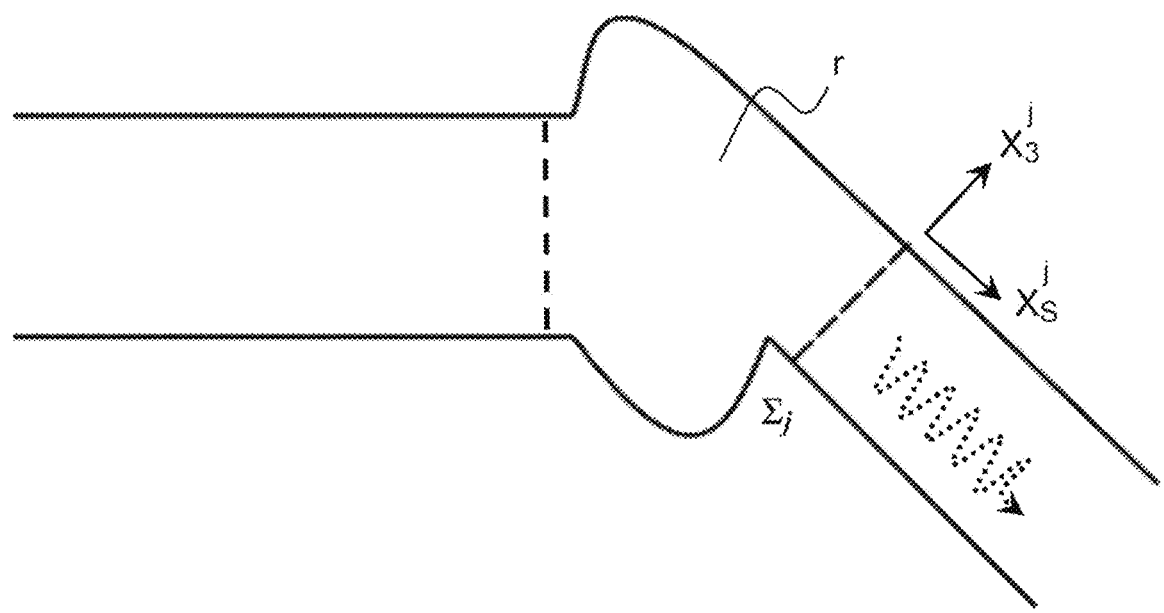
FIG. 5 shows a diagram illustrating one particular embodiment of the invention.

For a point x belonging to the guide j, located on the other side of the section $\Sigma_j$ with respect to the junction, with coordinates $x_j$ in the local reference frame of the guide j as illustrated in FIG. 5, there is:

$$u^{scat}(x) = \sum_n A_n^j u_n^j(x_j).$$

It is therefore possible to analytically propagate the scattered fields outside of the finite element region, i.e. outside of the region covered by the junction. To return to the reference fields, all that has to be done is then to add thereto the incident mode in the corresponding guides (the guide r for the field $u_m^{r,ref}$), which is known since it is not dependent on the junction.

Once the modes have been calculated using a method such as SAFE and the finite element problem has been solved in a limited region around the junction, the values of the reference fields at the other points of the sampling grid are therefore deduced by analytically calculating propagation of the incident field and of the field scattered by the disruption, inexpensively in terms of computing time and memory.

On the basis of the approximate calculations of the reference fields, the vector F(x) is then calculated and steps 405,406,407 of the method described above are applied.

REFERENCES

[1] Vahan Baronian, Laurent Bourgeois, Bastien Chapuis, Arnaud Recoquillay, Linear *Sampling Method applied to Non Destructive Testing of an elastic waveguide: theory, numerics and experiments, Inverse Problems*, 2018)

[2] Méthodes d'échantillonnage appliquées à l'imagerie de défauts dans un guide d'ondes élastiques (Arnaud Recoquillay, PHD thesis from the University of Paris-Saclay, 2018)

[3] Laurent Bourgeois, Jean-François Fritsch, Arnaud Recoquillay, *Imaging junctions of waveguides, Inverse Problems and Imaging*, 2020

[4] Vahan Baronian, Anne-Sophie Bonnet-Ben Dhia, Éric Lunéville, Transparent boundary conditions for the harmonic diffraction problem in an elastic waveguide, *Journal of Computational and Applied Mathematics*, 2010

The invention claimed is:

1. A method for imaging a structure composed of at least one wave guide connected to a junction, the structure supporting elastic wave guided propagation modes, the structure having at least one defect, the method comprising the following steps:

for at least one operating frequency, measuring, with a plurality of pairs of non-colocalized elastic wave sensors comprising transmitting sensors and receiving sensors, a plurality of signals propagating in the structure, the measured signals being arranged in a measurement matrix $\mathcal{M}$ having dimensions equal to a number of transmitting sensors by a number of receiving sensors, determining a plurality of propagation modes guided by the structure, correcting the measured signals based on ultrasound signals measured or simulated for the same structure in the absence of any defect, converting the measurement matrix $\mathcal{M}$ into a wave field scattering matrix U, determining, at each point of a sampling grid, a test vector F defining the structure without any defect, the components of the test vector F being the projections of a Green tensor from the defect-free domain onto the transverse functions of the guided propagation modes, applying a numerical inversion method to determine a vector H of modal components such that U.H=F at each point of a sampling grid, determining an image of the structure based on the vector H, and displaying the image on a screen.

2. The imaging method according to claim 1, wherein the scattering matrix U is determined by means of a relationship $\mathcal{M} = -\mathcal{R} U \varepsilon$ where $\mathcal{R}$ is a matrix whose coefficients are determined by the projection of a reception function of a sensor onto the guided propagation modes and $\varepsilon$ is a matrix whose coefficients are determined by the projection of a transmission function of a sensor onto the guided propagation modes.

3. The imaging method according to claim 1, wherein the test vector F is determined by:
calculating reference wave fields corresponding to sums of incident wave fields and wave fields scattered by the junction in the absence of any defect in the structure, and
determining the test vector F on the basis of the calculated reference wave fields.

4. The imaging method according to claim 3, wherein the reference wave fields are calculated by means of a finite element numerical solution.

5. The imaging method according to claim 4, wherein the reference wave fields are calculated by means of a finite element numerical solution in a region defined by the junction and are then propagated analytically in each wave guide.

6. The imaging method according to claim 5, wherein the reference wave fields in each wave guide are calculated on the basis of the reference wave fields in the junction by means of the following steps:
determining the wave fields scattered by the junction on the basis of the reference wave fields,
propagating the wave fields scattered by the junction in each wave guide by calculating the sum of the guided propagation modes weighted by the modal coefficients of the scattered wave fields, and
determining the reference wave fields in each wave guide as the sum of the propagated scattered wave fields and of the guided propagation modes.

7. The imaging method according to claim 1, wherein the image of the structure is determined on the basis of the inverse of the norm of the vector H at any point of the structure to be imaged.

8. The imaging method according to claim 1, wherein the steps of the method are executed for a plurality of operating frequencies.

9. The imaging method according to claim 8, wherein the imaging of the structure is determined on the basis of a sum of the squared norms of the vectors H calculated for various operating frequencies, at any point of the structure to be imaged.

10. The imaging method according to claim 1, wherein the elastic wave sensors are positioned on the surface of the structure or integrated into the structure.

11. The imaging method according to claim 1, wherein the method implements non-destructive testing of mechanical structures and/or the method implements structural health monitoring.

12. The imaging method according to claim 1, wherein the method provides imaging of structures to detect a presence of defects.

13. The imaging method according to claim 1, wherein the method provides implementation of the plurality of pairs of non-colocalized elastic wave sensors positioned only on a surface of a structure.

14. An imaging device comprising an array of elastic wave sensors intended to be positioned on a structure to be imaged, a display unit, and a processing unit configured to receive the signals measured by the sensors and configured to execute the steps of the imaging method according to claim 1.

15. The imaging device according to claim 14, wherein the elastic wave sensors are chosen from among piezoelectric transducers, electromagnetic acoustic transducers or fibre Bragg gratings.

16. The imaging device according to claim 14, wherein the elastic wave sensors are positioned on the surface of the structure or integrated into the structure.

17. A method for imaging a structure composed of at least one wave guide connected to a junction, the structure supporting elastic wave guided propagation modes, the structure having at least one defect, the method comprising the following steps:
providing a plurality of pairs of non-colocalized elastic wave sensors comprising transmitting sensors and receiving sensors,
measuring with the plurality of pairs of non-colocalized elastic wave sensors, for at least one operating frequency, a plurality of signals propagating in the structure, the measured signals being arranged in a measurement matrix $\mathcal{M}$ having dimensions equal to a number of transmitting sensors by a number of receiving sensors,
determining with a processing unit a plurality of propagation modes guided by the structure,
correcting with the processing unit the measured signals based on ultrasound signals measured or simulated for the same structure in the absence of any defect,
converting with the processing unit the measurement matrix $\mathcal{M}$ into a wave field scattering matrix U,
determining with the processing unit, at each point of a sampling grid, a test vector F defining the structure without any defect, the components of the test vector F being the projections of a Green tensor from the defect-free domain onto the transverse functions of the guided propagation modes,
applying with the processing unit a numerical inversion method to determine a vector H of modal components such that U.H=F at each point of a sampling grid,
determining with the processing unit an image of the structure based on the vector H, and
displaying the image on a screen and/or interface in response to the processing unit.

* * * * *